(12) United States Patent
Hoffmann

(10) Patent No.: US 11,986,979 B2
(45) Date of Patent: May 21, 2024

(54) DOUBLE ARM MIXER EXTRUDER

(71) Applicant: AARON ENGINEERED PROCESS EQUIPMENT, INC., Wood Dale, IL (US)

(72) Inventor: Jeffrey R. Hoffmann, Schaumburg, IL (US)

(73) Assignee: AARON ENGINEERED PROCESS EQUIPMENT, INC., Wood Dale, IL (US)

( * ) Notice: Subject to any disclaimer, the term of this patent is extended or adjusted under 35 U.S.C. 154(b) by 320 days.

(21) Appl. No.: 17/484,465

(22) Filed: Sep. 24, 2021

(65) Prior Publication Data

US 2023/0098369 A1 Mar. 30, 2023

(51) Int. Cl.
*B29B 7/46* (2006.01)
*B01F 27/1143* (2022.01)
*B01F 27/2123* (2022.01)
*B29B 7/48* (2006.01)

(52) U.S. Cl.
CPC .......... *B29B 7/465* (2013.01); *B01F 27/1143* (2022.01); *B01F 27/2123* (2022.01); *B29B 7/488* (2013.01)

(58) Field of Classification Search
CPC ............... B29B 7/465; B01F 27/1143; B01F 35/75455; B01F 35/754551
USPC ......................................................... 366/84
See application file for complete search history.

(56) References Cited

U.S. PATENT DOCUMENTS

| | | | |
|---|---|---|---|
| 946,146 A | 1/1910 | Merrick | |
| 1,703,211 A | 2/1929 | Schmierer | |
| 2,350,448 A | 6/1944 | Collins | |
| 2,615,689 A | 10/1952 | Schnuck et al. | |
| 2,725,220 A | 11/1955 | Hale et al. | |
| 3,545,533 A | 12/1970 | Matsuoka et al. | |
| 3,704,866 A | 12/1972 | Mosher et al. | |
| 3,854,627 A * | 12/1974 | Coons | A21C 5/00 366/186 |
| 3,908,032 A * | 9/1975 | Didelot | A23G 3/0205 426/660 |

(Continued)

FOREIGN PATENT DOCUMENTS

| | | |
|---|---|---|
| EP | 2343170 | 7/2011 |
| EP | 3165343 | 5/2017 |
| IN | 348MU2014 | 9/2015 |

OTHER PUBLICATIONS

Abster Equipments, "Sigma Mixer Extruder", access on-line at: http://www.sigmamixermachine.com/sigma-mixer-extruder.html (Jun. 4, 2021).

*Primary Examiner* — Marc C Howell
(74) *Attorney, Agent, or Firm* — Barnes & Thornburg LLP; G. Peter Nichols

(57) ABSTRACT

A mixer having a discharge screw centrally located between first and second side walls and disposed in a cavity provided in the bottom. The discharge screw has (a) a shaft with a first end that extends through a first end wall and (b) a driven end opposite the first end of the shaft, with the driven end being connected to a motor shaft for rotating the discharge screw in at least one direction. The driven end has a recessed portion that extends into the second end wall of the vessel. The mixer may include a deflector that is fixed to the second end wall and extends toward the first end wall and is located between the mixing blades and the discharge screw.

17 Claims, 6 Drawing Sheets

(56) References Cited

U.S. PATENT DOCUMENTS

| | | |
|---|---|---|
| 3,941,357 A | 3/1976 | Wurtz |
| 4,015,828 A | 4/1977 | Miles |
| 4,184,773 A | 1/1980 | Ellwood |
| 4,269,582 A | 5/1981 | Mella |
| 4,332,481 A | 6/1982 | Inoue et al. |
| 4,380,397 A | 4/1983 | Hashizume et al. |
| 4,681,457 A | 7/1987 | Orimo et al. |
| 4,767,216 A | 8/1988 | Gwinn et al. |
| 5,186,539 A | 2/1993 | Manser et al. |
| 5,866,201 A | 2/1999 | Blue |
| 5,993,187 A | 11/1999 | Manser et al. |
| 6,883,954 B2 | 4/2005 | Rothammel et al. |
| 7,077,558 B2 | 7/2006 | Bodenstorfer |
| 10,888,107 B2 | 1/2021 | McCalley et al. |
| 2003/0128625 A1 | 7/2003 | Cabler, Jr. |
| 2009/0238031 A1 | 9/2009 | Conard et al. |
| 2011/0174168 A1 | 7/2011 | Campbell |
| 2015/0330839 A1 | 11/2015 | Yada et al. |
| 2018/0147746 A1 | 5/2018 | Inoue et al. |
| 2020/0367509 A1 | 11/2020 | Tsai et al. |

\* cited by examiner

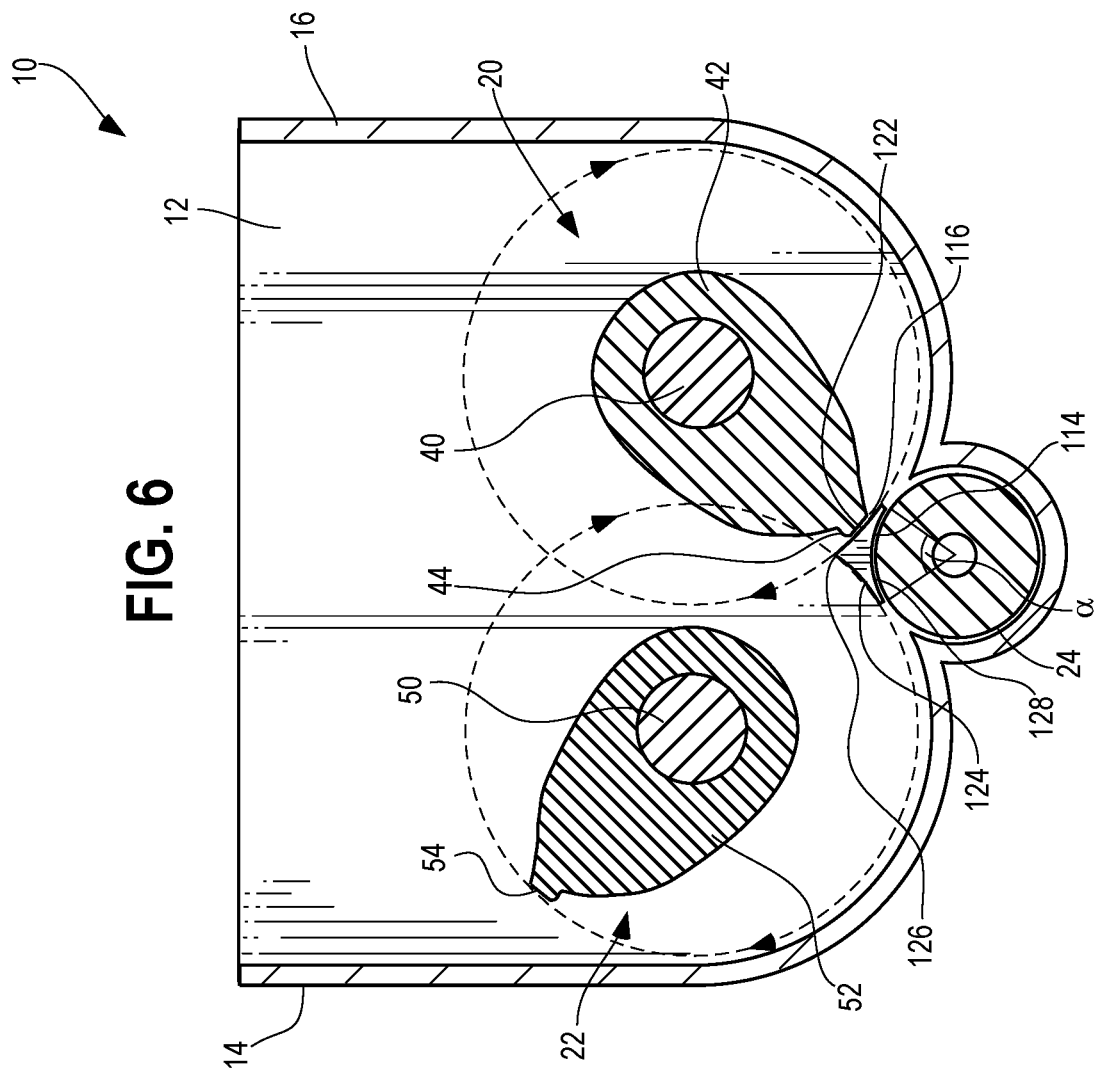

DOUBLE ARM MIXER EXTRUDER

The present disclosure describes an improved double arm mixer-extruder that solves the problem of undesired material leakage at the drive end of the auger/discharge screw.

BACKGROUND

Double arm mixer-extruders, of which sigma blade mixers are an example, are typically used for mixing high viscosity materials such as doughs, chewing gum base, rubbers including silicone rubber, butyl rubber and the like. During operation, the mixing blades are counter-rotating and thus always run in the same direction, that is, down into the middle of the mixer bowl. Such mixers may include an auger or discharge screw that rotates in two directions. In one direction, the discharge screw rotates in a discharge direction that forces the mixed product out of one end of the mixer, which may be considered to be the front (first) wall of the mixer. In the other direction, during mixing, the discharge screw rotates in a mixing direction that forces the mixed product away from the outlet of the mixer and toward the end of the mixer opposite the outlet, which may be considered to be the rear (second) wall of the mixer. In other words, during operation (i.e., during the mixing operation), the discharge screw rotates in a direction that forces the mixing product toward the center of the vessel and toward the rear wall of the mixer.

It has been found that, during mixing, the combination of the mixing blades forcing the product down toward the bottom of the mixer and the discharge screw rotating in a mixing direction, the mixing product is driven into the rear wall. As a result, there can be product leakage in the area around the driven end of the discharge screw.

To address this issue, manufacturers have sought to provide seal designs that seek to prevent leakage. While the seals are somewhat effective, leakage still occurs. Thus, there is a need for a solution to the leakage problem.

SUMMARY

In one aspect, the disclosure describes a mixer that includes a generally double-U-shaped vessel (or bowl) with an opening at the top. The vessel (or bowl) has a first side wall, a second side wall spaced from and parallel to the first side wall, with each side wall terminating at a bottom, a first end and a second end spaced from and parallel to the first end. Within the vessel (or bowl) a pair of parallel spaced apart shafts are disposed with each shaft extending from the first end to the second end of the vessel. Each shaft is provided with at least one mixing blade. The at least one mixing blade can be any suitable type of mixing blade that is effective to thoroughly mix ingredients. In one embodiment, the mixing blade is of the sigma type mixing blade.

The described mixer is generally a mixer-extruder type of mixer and, accordingly, a discharge screw is centrally located between the first and second side wall and disposed in a cavity provided in the bottom of the vessel. The discharge screw has (a) a shaft with a first end that extends through the first wall and terminates in a nose and (b) a driven end opposite the first end of the shaft with the driven end being connected to a motor shaft for rotating the discharge screw in at least one direction. The shaft has a root diameter with a plurality of flights extending outwardly from the shaft along a longitudinal length of the discharge screw.

The driven end also has a recessed portion that extends into the second end wall of the vessel. The recessed portion extends into the second end wall of the vessel a distance that is less than a thickness of the second end wall. In some instances, the mixer may have a cylindrical portion with a circular cross section that has a first diameter that is greater than the root diameter. The cylindrical portion may extend from the recessed end toward the first end a distance (a length) from about 2 to about 25 cm.

In some embodiments, the cylindrical portion tapers inwardly to define a conical portion such that at a distal portion of the driven end, the conical portion is coextensive with the shaft and has a diameter substantially equal to the root diameter. As noted above, the plurality of flights may extend from a location adjacent the first end of the shaft to a location between the cylindrical portion and the distal portion of the driven end of the shaft. In some embodiments, the plurality of flights may extend outwardly from the shaft along a longitudinal length of the discharge screw, and may extend from a location adjacent the first end to the conical portion with no flights being present on the cylindrical portion.

In other embodiments, the mixer may include a deflector fixed to the second wall and extending toward the first wall. The deflector may be located vertically between the mixing blades and the discharge screw. In some instances, the deflector has a chevron-shaped cross section. The deflector may have a bottom with a radius of curvature that is substantially the same as the cylindrical portion of the driven end. In some instances the bottom of the deflector may be spaced from the driven end to provide a gap between the deflector and the driven end. The bottom of the deflector may be adjacent to and spaced from the cylindrical portion to define an arc on the cylindrical portion such that an angle subtended by the arc ranges from about 60° to about 75°.

The deflector has a top surface that is spaced from an outer extent of the mixing blades to provide a gap. In some cases, the gap changes from a maximum to a minimum as the at least one mixing blade rotates.

The disclosure also contemplates a method of mixing materials in the above-described apparatus. In this regard, the method may include providing a mixing apparatus with a vessel 10 containing one or more of the above features, i.e., a discharge screw having a driven end recessed into the rear wall, a discharge screw having a cylindrical portion free of flights, having a diameter greater than the root diameter of the shaft of the discharge screw, and being tapered at a proximal end to define a conical portion that is coextensive with the shaft of the discharge screw, a deflector extending from the rear end wall of the vessel or bowl. With the apparatus in mind, the contemplated method includes introducing material to be mixed through the opening of the vessel, causing the mixing blades to rotate, causing the discharge screw to rotate in a mixing direction at a first speed, and, at a time when the material to be mixed is complete (as understood by the known operator based on the material to be mixed), causing the discharge screw to rotate in a discharge direction at a second speed. The first speed is less than the second speed and in this regard, the first speed may be about 5%, 10%, 15%, 20%, 25%, 30%, 35%, 40%, 45%, 50%, 55%, 60%, 65%, 70%, 75%, 80%, 85% or 90% of the second speed.

While the above features, alone or in combination, may be effective in preventing leakage out the rear end wall of the mixer, it is contemplated that, during the mixing operation, the speed of the discharge screw can be reduced, which should reduce the pressure on the seal arrangement for the discharge screw at the rear wall. The speed can be reduced by any suitable amount from the typical operating speed of about 10 rpm to about 60 rpm. To this end, the speed can be reduced by 5%, 10%, 15%, 20%, 25%, 30%, 35%, 40%, 45%, 50%, 55%, 60%, 65%, 70%, 75%, 80%, 85% or 90% of the typical operating speed.

DESCRIPTION OF THE DRAWINGS

The above aspects and other features, aspects, and advantages of the described apparatus may be better understood with regard to the following description, appended claims, and accompanying drawings.

FIG. 6 is a cross-sectional view of the double arm mixer-extruder according to the present disclosure and taken along line 6-6 in FIG. 4.

DESCRIPTION

It is to be understood by one of ordinary skill in the art that the present discussion is a description of specific embodiments only and is not intended to limit the broader aspects of the described apparatus and method.

Figure 1:
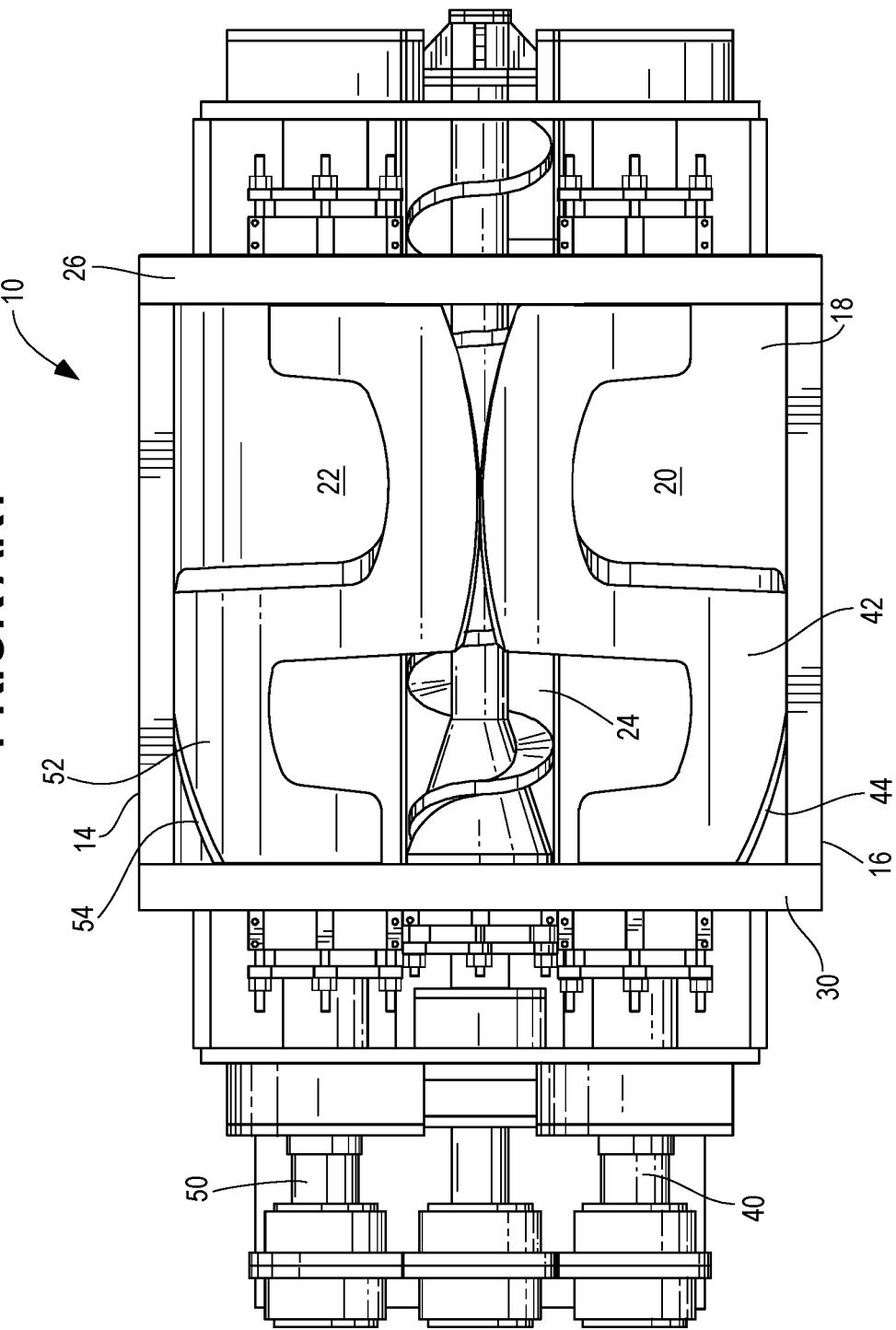
FIG. 1 is a top plan view of a prior art double arm mixer-extruder having a discharge screw and with a top portion of the mixer being removed to show other portions of the mixer.

Turning to FIG. 1, a top view of a prior art double arm mixer-extruder 10 is shown. Typical of such a mixer-extruder, there is a vessel 10 with an opening at the top, a first end wall 26 and a second end wall 30 spaced from and parallel to the first end wall 26, a first side wall 14 and a second side wall 16 spaced from and parallel to the first side wall 14. The vessel has an opening at the top of the vessel wall 14 for loading the material into the vessel, and the opening is typically closed by a lid (not shown).

Each side wall 14, 16 terminates at the bottom 18 of the vessel 10. The interior of the bottom 18 has a pair of rotor chambers 20, 22 that have an identical cylindrical shape disposed in the vessel 10 and are symmetrically connected to each other with their axis lines being arranged horizontally parallel side-by-side so that the two rotor chambers 20, 22 communicate with each other. An open topped chevron-shaped cavity 24 is formed on the inner bottom 18 of the vessel 10 at the boundary of inner peripheral surfaces of the two rotor chambers 20, 22, such that the cavity 24 is centrally disposed between the two side walls 14, 16. This construction is sometimes referred to as a double-U-shaped vessel 10. The rotor chambers 20, 22 have a cross section that is uniform in the axis direction.

Two shafts 40, 50 are rotatably supported by the end walls 26, 30 (the first and second walls) of the vessel and each shaft is disposed in the rotor chambers 20, 22, respectively. The shafts 40, 50 are rotatably disposed and spaced from the inner peripheral surfaces of the rotor chambers 20, 22. The shafts 40, 50 may rotate at the same rotating speed or at different speeds. Each shaft 40, 50 is provided with at least one mixing blade on their outer periphery 42, 52 respectively. In some instances, the at least one mixing blade is a type known as a sigma mixing blade. Each shaft 40, 50 is connected to a driving source (a motor driven shaft) so that the mixing blades 42, 52 rotate downwardly on the communicating side of the rotor chambers 20, 22. The geometry and profile of the sigma blade is designed such that the mass of material is pulled, sheared, compressed, kneaded, and folded by the action of the blades against the walls of the vessel 10.

An auger or discharge screw 60 is provided in the cavity 24 and, as such, is parallel to each of the shafts 40, 50. It will be appreciated that, in operation, the discharge screw 60 is located below (in a vertical direction) each of the shafts 40, 50. Because the cavity 24 is centrally located between the side walls 14, 16, the discharge screw 60 is likewise centrally located between the side walls 14, 16. The discharge screw 60 has a nose 68 at one end 66 that extends outwardly from the first end wall 26 of the vessel 10 and the second end (or driven end) 70 is connected to a motor shaft for rotating the discharge screw in at least one and preferably in two directions, i.e., a mixing direction and a discharge direction.

Typically, during a mixing operation, the materials to be mixed are introduced into the vessel through the top, the mixing shafts 40, 50 are caused to rotate, which causes the mixing blades 42, 52 to rotate and force the material downward and toward the center portion of the vessel 10. At the same time, the discharge screw 60 is rotated in a mixing direction, which causes the material in the vessel 10 to move from the first end wall 26 toward the center of the vessel 10 and the second wall 30; thus, precluding material from exiting the vessel 10 adjacent the nose 68 of the discharge screw 60. When the material sought to be mixed has been sufficiently mixed, the rotation of the discharge screw 60 is reversed to that the discharge screw 60 rotates in a discharge direction forcing the mixed material out of the vessel 10 through an opening in the first end wall 26 provided for the discharge screw 60.

Figure 2:
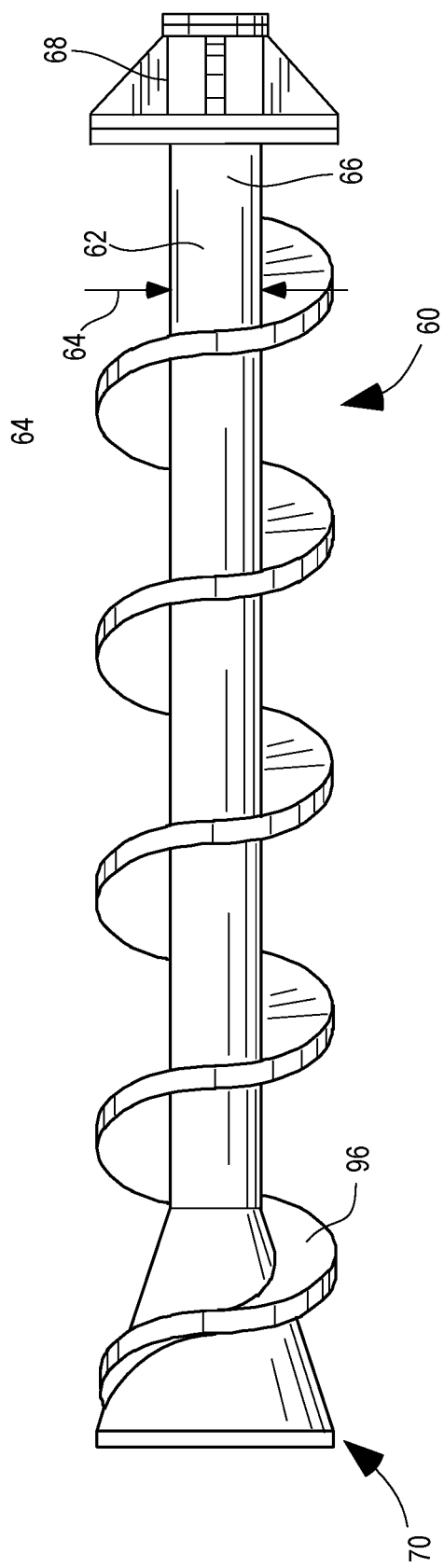
FIG. 2 is a view of a prior art discharge screw used in the prior art double arm mixer-extruder shown in FIG. 1.
Figure 3:
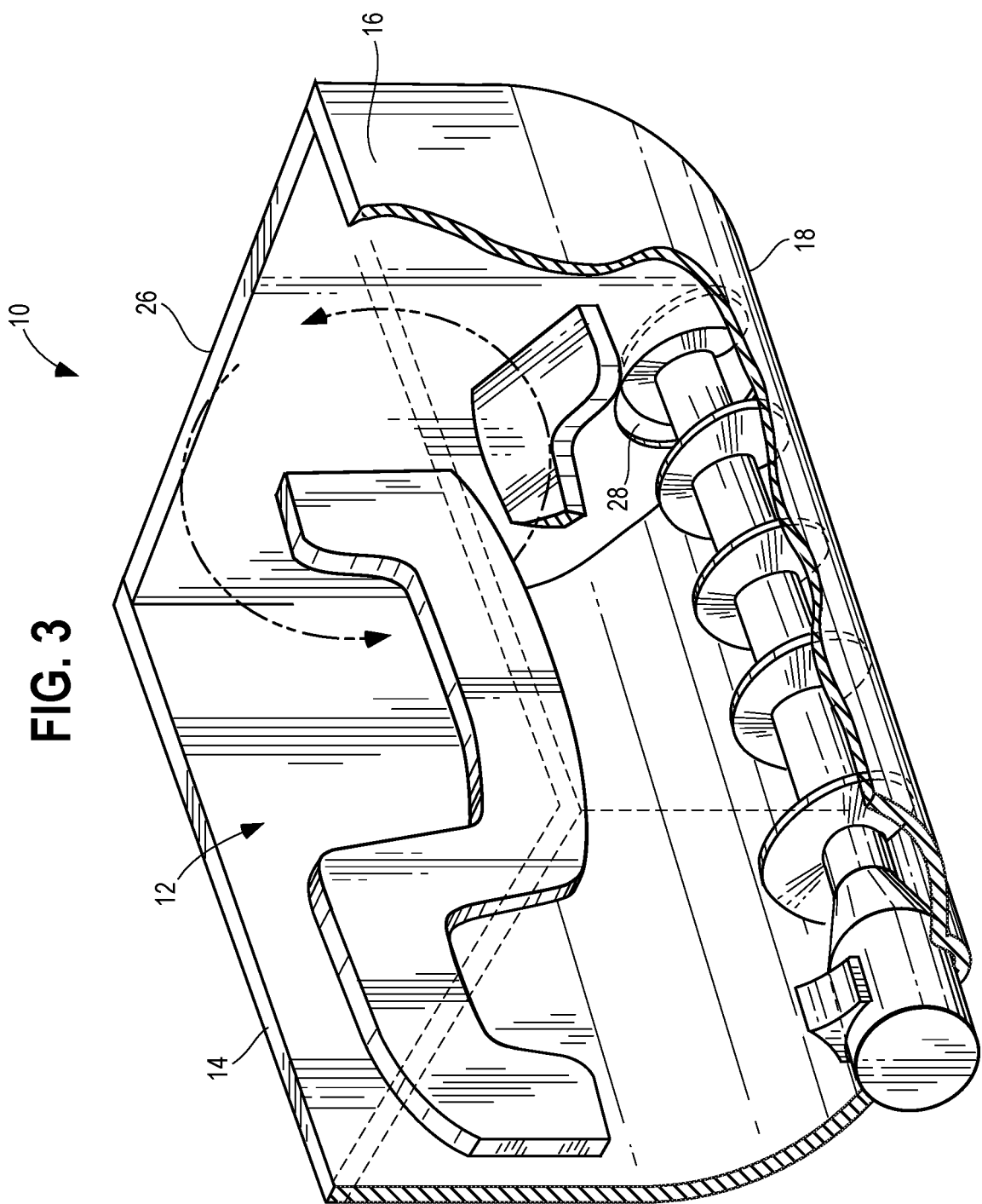
FIG. 3 is a partially cut-away perspective view of a double arm mixer-extruder according to the present disclosure, with a portion of one of the mixer blades not being shown to provide more clarity.

Referring to FIG. 2, a prior art discharge screw 60 is shown. The prior art discharge screw is characterized by its construction and location within the vessel 10. The prior art discharge screw 60, at its driven end 70, is conically shaped with flights 96 extending from the first end 66 the shaft 62 of the discharge screw 60 onto the conically shaped portion and nearly to the terminal portion of the driven end 70 of the discharge screw 60. In addition, the terminus of the driven end 70 is flush with the interior of the second end wall 30 of the vessel 10 such that the motor shaft extends through the second wall of the vessel to connect to the discharge screw 60.

As noted above, it has been found that, during mixing, the combination of the mixing blades forcing the product down toward the bottom of the vessel 10 and the discharge screw 60 rotating in a mixing direction, the mixing product is driven into the rear end wall 30. As a result, there can be product leakage out of the vessel 10 in the area around the driven end 70 of the discharge screw 60.

Turning now to FIGS. 3-6, details of the improved mixer, discharge screw, and deflector will now be described. The vessel 10 has an opening 12 at the top for loading the material into the vessel 10, and the opening is typically closed by a lid (not shown). The vessel 10 has a first end 26 from which the mixed product is discharged through a discharge opening 28 and a second end 30 spaced from and parallel to the first end 26.

The vessel 10 also has a first side wall 14 and a second side wall 16 spaced from and parallel to the first side wall. Each side wall 14, 16 terminates at the bottom 18 of the vessel. The interior of the bottom has a pair of rotor chambers 20, 22 that have an identical semi-cylindrical shape and are symmetrically connected to each other with their axis lines being arranged horizontally parallel side by side so that the rotor chambers 20, 22 communicate with each other. An open topped chevron-shaped cavity 24 is formed on the inner portion of the bottom 18 of the vessel 10 at the boundary of inner peripheral surfaces of the rotor chambers 20, 22, such that the cavity 24 is centrally disposed between the two side walls 14, 16. This construction is sometimes referred to as a double-U-shaped vessel. The rotor chambers 20, 22 have a cross section that is uniform in the axis direction.

A first and second mixing shaft 40, 50 are rotatably supported by the end walls 26, 30 of the vessel 10 and each mixing shaft 40, 50 is disposed in the rotor chambers 20, 22, respectively. The mixing shafts 40, 50 are rotatably disposed and spaced from the inner peripheral surfaces of the rotor chambers 20, 22. The shafts 40, 50 may rotate at the same rotating speed or at different speeds. Each shaft 40, 50 is provided with at least one mixing blade 42, 52, respectively on its outer periphery. In some instances, the at least one mixing blade is a type known as a sigma mixing blade.

Each mixing shaft 40, 50 is connected at its driven end to a driving source so that the mixing blades rotate downwardly on the communicating side of the rotor chambers 40, 50. The geometry and profile of the sigma blade is designed such that the mass of material to be mixed is pulled, sheared, compressed, kneaded, and folded by the action of the blades against the walls of the vessel 10.

An auger or discharge screw 60 is rotatably provided in the cavity 24 and, as such, is parallel to each of the mixing shafts 40, 50. It will be appreciated that, in operation, the discharge screw 60 is located below (in a vertical direction) each of the mixing shafts 40 50. Because the cavity 24 is centrally located between the side walls 14, 16, the discharge shaft 60 is likewise centrally located between the side walls 14, 16. The discharge screw 60 has a shaft 62 with a first end 66 that terminates in a nose 68 and that extends outwardly from the first end wall 26 of the vessel through the discharge opening 28. The discharge screw 60 has a second end (or driven end) 70 that is connected through a seal arrangement 102 to a motor shaft 100 for rotating the discharge screw 60 in at least one and generally in two directions, i.e., a mixing direction and a discharge direction.

Figure 4:
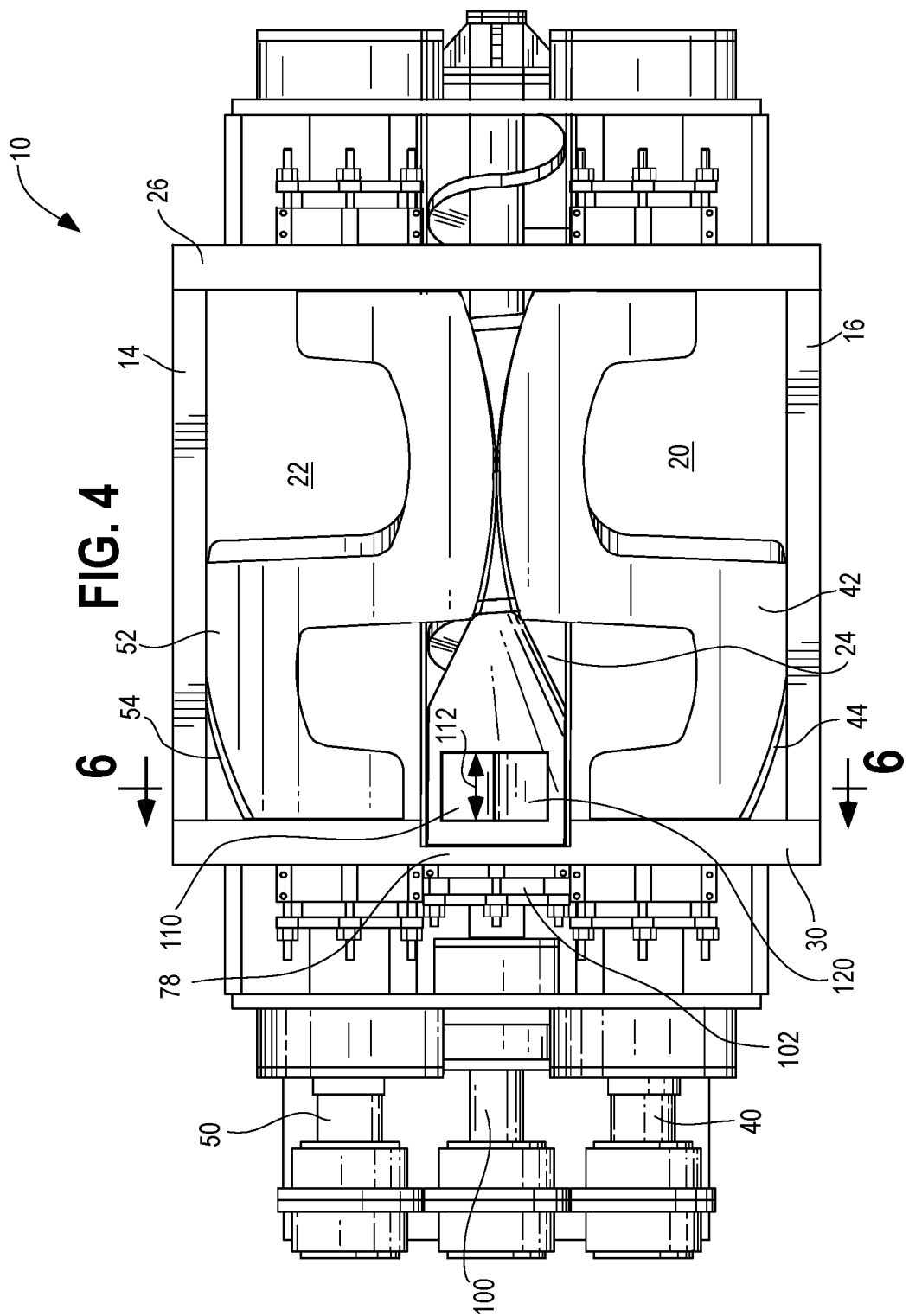
FIG. 4 is a top plan view of a double arm mixer-extruder according to the present disclosure having a discharge screw and with a top portion of the mixer being removed to show other portions of the mixer.
Figure 5:
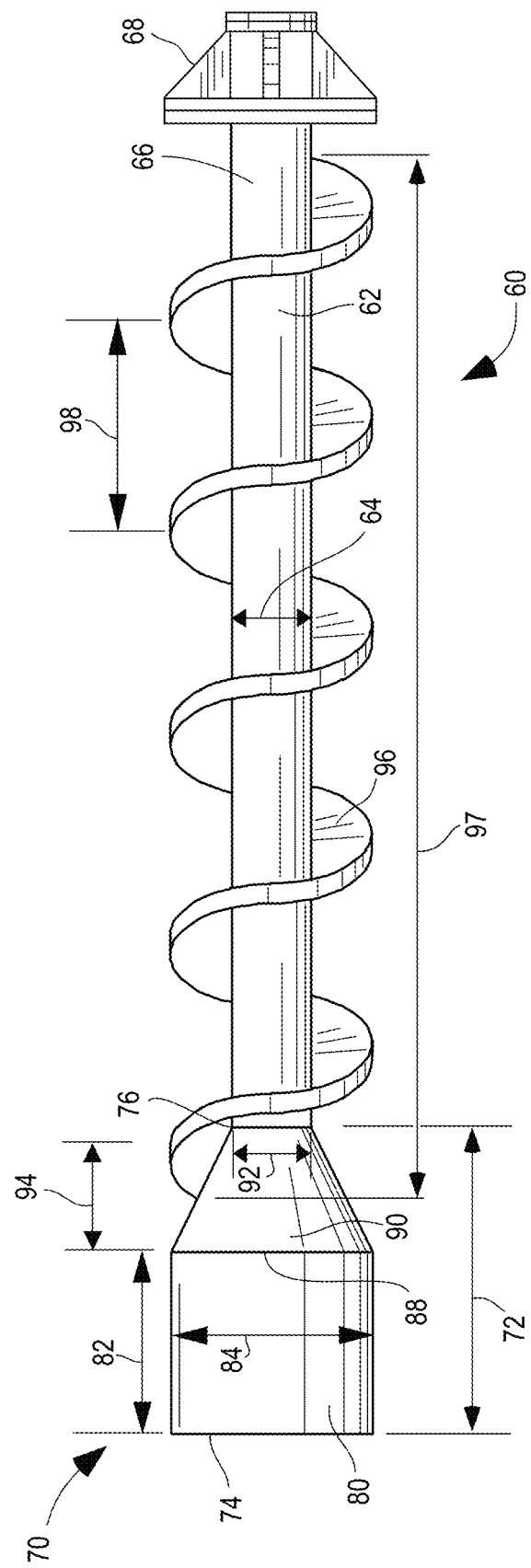
FIG. 5 is a view of the discharge screw according to the present disclosure and useful in the double arm mixer-extruder of FIG. 4.

Referring more particularly to FIG. 5, a discharge screw 60 according to the present disclosure is shown. The discharge screw 60 has, at its driven end 70, and more particularly at a proximal end (proximal portion) 74 of the driven end, a recessed portion 78 (best seen in FIG. 4) that extends into the second end wall 30 of the vessel where it is connected with one end of the motor shaft 100 so that the discharge screw can be rotated. The recessed portion 78 extends only partially into the second end wall (rear wall) 30 of the vessel, i.e., between about 10% to about 75% of the thickness of the second end wall 30 or in some instances between about 25% to about 50% of the thickness of the second end wall 30. In some instances, the recessed portion 78 extends into the second end wall 30 an amount that ranges from about 10% to about 90% of the total thickness of the second wall, or from about 15%, 20%, 25%, 30%, 35%, 40%, 45%, 50%, 55%, 60%, 65%, 70%, 75%, 80%, or about 85%. It will be appreciated that the recessed portion 78 that extends into the rear wall 30 of the vessel 10 effectively creates a simple labyrinth, which it is believed should reduce the pressure and flow to and past the seal arrangement 102.

The driven end 70, at the proximal end 74, has a circular cross section that defines a cylindrical portion 80 of the driven end 70 of the discharge screw. The cylindrical portion extends 80 from the proximal end 74 toward the first end 66 of the shaft to a transition point 88 where the cylindrical portion tapers inwardly toward a distal end (distal portion) 76 of the driven end 70 to define a conical portion 90 that, at the distal end 76 of the driven end, becomes coextensive with the shaft 62 of the discharge screw 60. The shaft 62 of the discharge screw 60 has a root diameter 64 that is less than the diameter 84 of the cylindrical portion 80. As such, it will be appreciated that the distal end 76 of the driven end 70 has a diameter 92 that is the same as or substantially the same as the root diameter 64. In addition, it will be appreciated that the root diameter 64 is less than or smaller than the diameter of the cylindrical portion 84.

In some instances, the root diameter is about 25% to about 50% smaller than the diameter of the cylindrical portion 84. In some embodiments, the diameter 84 of the cylindrical portion 80 may be about 2 cm to about 40 cm.

The length 82 of the cylindrical portion 80 may be in the range of about 2 cm to about 25 cm and may be less than, equal to, or greater than the length 94 of the conical portion 90.

A plurality of flights 96 extend radially outward from the shaft 62 in a known manner, which as depicted in FIG. 5, is in a corkscrew manner. The plurality of flights 96 may have a pitch 98 that is equal or substantially equal along the flight length 97 of the discharge screw 70. The plurality flights 96 extend longitudinally from first end 66 of the shaft toward the driven end 70 to define the flight length 97. The plurality of flights 96 begin at a location adjacent to but spaced from the nose 68 and stop at a location between the distal portion 76 of the driven end and the transition point 88. In some instances, the plurality of flights 96 end at a location between about 40% to about 60%, or at about 50% of the distance between the distal portion 76 of the driven end and the transition point 88. Importantly, there are no flights provided on the cylindrical portion 80 of the discharge screw. Without being bound by any theory, the inventor believes that the absence of flights on the cylindrical portion 80 of the discharge screw 70 will, during the mixing operation when the discharge screw 70 is rotating in the mixing direction, reduce the pressure and forces seeking to direct the material being mixed out the second end 30 in the area surrounding the recessed portion 78 of the driven end 70.

Referring now specifically to FIGS. 4 and 6, a deflector 110 is provided between the cylindrical portion 80 of the discharge screw 60 and the opening 12 of the vessel or bowl 10. In some instances, the deflector 110 is located between the cylindrical portion 80 and the outer extent of the mixing blades 44, 54 so that there is a small gap 114 between the deflector and the cylindrical portion and a small gap 116 between the deflector and the outer extent of the mixing blades.

The deflector 110 may be fixed to the interior of the second end (rear) wall 30 so that the deflector 110 extends toward the first end (front) wall 26 of the vessel 10. The deflector 110 may extend toward the first end wall 26 a distance 112 equal to the length 82 of the cylindrical portion 80 or, in some instances a fraction of the length 82 of the cylindrical portion 80. Accordingly, the deflector 110 may extend from the second wall 30 about 5%, 10%, 15%, 20%, 25%, 30%, 35%, 40%, 45%, 50%, 55%, 60%, 65%, 70%, 75%, 80%, 85%, 90%, or about 95% of the length 82 of the cylindrical portion 80. To that end, the deflector 110 may extend from the second wall 30 about 0.25 centimeters or about 0.5, 0.75, 1.0, 1.25, 1.5, 1.75, 2.0, 2.25, 2.5, 2.75, 3.0, 3.25.3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25, 10.5, 10.75, 11.0, 11/25, 11.5, 11.75, 12.0, 12.25, 12.5, 12.75, 13.0, 13.25, 13.5, 13.75, 14.0, 14.25, 14.5, 14.75, or about 15.0 cm.

The deflector 110 has a substantially chevron-shaped cross section with a bottom 128 adjacent and opposed to the outer peripheral extent of the cylindrical portion 80. The bottom of the deflector 128 has a radius of curvature 118 in a manner to follow a radius of curvature 86 of the cylindrical portion 80 to provide a substantially constant gap width between the bottom 128 of the deflector 110 and the outer periphery 81 of the cylindrical portion 80. In that regard, the bottom 128 of the deflector has a radius of curvature 118 that is substantially the same as the radius of curvature 81 of cylindrical portion 80. Put another way, the bottom 128 of the deflector defines an arc 119 on the cylindrical portion 80 such that an angle α subtended by the arc 119 ranges from about 60° to about 75°.

As noted above, the deflector 110 is spaced from the cylindrical portion 80 a distance such that a small gap 114 exists between the bottom 128 of the deflector 110 and the outer periphery 81 of the cylindrical portion. The gap across the arc 119 is substantially constant and is in the range of about 0.25 cm to about 3 cm.

The top 120 of the deflector 110 has a first portion 122 and a second portion 124 that meets the first portion at a crest 126. Each of the first and second portion has a generally concave profile that defines an arc gap 116 between the outer peripheral extent of the respective mixing blades 44, 54. The arc gap 116 is substantially constant when the outer peripheral extent of the respective mixing blades 44, 54, is adjacent the deflector 110. During this time, the arc gap 116 ranges from about 0.25 cm to about 3 cm.

However, it will be appreciated that when the mixing blades 42, 52 are of the sigma-type mixing blades, the arc gap 116 will vary from a minimum distance when the outer peripheral extent of the respective mixing blades 44, 54 is adjacent the deflector 110 to a maximum distance when the outer peripheral extent of the respective mixing blades 44, 54 are opposite from (i.e., 180° from) the deflector 110.

Without being bound by any particular theory, the inventor believes that the presence of the deflector 110 during the mixing operation, when the discharge screw 60 is rotating in a mixing direction, i.e., in a direction toward the second end wall (the rear wall) 30, will operate to reduce the pressure or forces seeking to move the material in the vessel 10 out toward the seal arrangement 102. Put another way, the deflector 110 will act to block all, nearly all, or a substantial amount of the material being mixed from exiting the vessel 10 through the seal arrangement 102.

The present disclosure also contemplates a method of mixing materials in the apparatus described above. In this regard, the method includes providing an apparatus containing one or more of the above features, i.e., a discharge screw having a driven end recessed into the rear wall, a discharge screw having a cylindrical portion free of flights, having a diameter greater than the root diameter of the shaft of the discharge screw, and being tapered at a proximal end to define a conical portion that is coextensive with the shaft of the discharge screw, a deflector extending from the rear wall of the vessel or bowl. With the apparatus in mind, the contemplated method includes introducing material to be mixed through the opening of the vessel, causing the mixing blades to rotate, causing the discharge screw to rotate in a mixing direction at a first speed, at a time when the material to be mixed is complete (as understood by the known operator based on the material to be mixed), causing the discharge screw to rotate in a discharge direction at a second speed. The first speed is less than the second speed and in this regard, the first speed may be about 5%, 10%, 15%, 20%, 25%, 30%, 35%, 40%, 45%, 50%, 55%, 60%, 65%, 70%, 75%, 80%, 85% or 90% of the second speed.

While the above features, alone or in combination, may be effective in preventing leakage out the rear end wall of the mixer, it is contemplated that, during the mixing operation, the speed of the discharge screw can be reduced, which should reduce the pressure on the seal arrangement for the discharge screw at the rear wall. The speed can be reduced by any suitable amount from the typical operating speed ranging from about 10 rpm to about 60 rpm. To this end, the speed can be reduced by 5%, 10%, 15%, 20%, 25%, 30%, 35%, 40%, 45%, 50%, 55%, 60%, 65%, 70%, 75%, 80%, 85% or 90% of the typical operating speed.

While the concepts of the present disclosure are susceptible of various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A mixer comprising:
a vessel with an opening, a first side wall, a second side wall spaced from and parallel to the first side wall, each side wall terminating at a bottom, a first end wall and a second end wall spaced from and parallel to the first end wall, with the second end wall having a recess;
a pair of parallel spaced apart shafts, each shaft extending from the first end wall to the second end wall and each shaft being provided with at least one mixing blade; and
a discharge screw centrally located between the first and second side wall and disposed in a cavity provided in the bottom, the discharge screw has (a) a shaft with a first end that extends through the first end wall and (b) a driven end opposite the first end of the shaft, with the driven end being connected to a motor shaft for rotating the discharge screw in at least one direction; the driven end having a recessed portion that extends into the recess of the second end wall of the vessel;
wherein the recessed portion extends into the recess of the second end wall of the vessel a distance that is less than a thickness of the second end wall.

2. The mixer of claim 1 wherein the shaft, between the first end and the driven end, has a root diameter.

3. The mixer of claim 2 further comprising a plurality of flights extending outwardly from the shaft along a longitudinal length of the discharge screw.

4. The mixer of claim 2 wherein the driven end has a cylindrical portion with a circular cross section with a first diameter that is greater than the root diameter.

5. The mixer of claim 4 wherein the cylindrical portion extends from a proximal portion of the discharge screw toward the first end of the shaft a distance from about 2 cm to about 25 cm.

6. The mixer of claim 5 wherein, the cylindrical portion tapers inwardly to define a conical portion such that at a distal portion of the driven end, the conical portion is coextensive with the shaft and has a diameter substantially equal to the root diameter.

7. The mixer of claim 1 wherein the discharge screw rotates in two directions.

8. The mixer of claim 3 wherein the plurality of flights extends from a location adjacent the first end of the shaft to a location between the cylindrical portion and the distal portion of the driven end.

9. The mixer of claim 6 further comprising a plurality of flights extending outwardly from the shaft along a longitudinal length of the discharge screw, wherein the plurality of flights extends from a location adjacent the first end of the shaft to the conical portion with no flights being present on the cylindrical portion.

10. The mixer of claim 1 further comprising a deflector fixed to the second end wall and extending toward the first end wall, the deflector located between the mixing blades and the discharge screw.

11. The mixer of claim 10 wherein the deflector has a chevron-shaped cross section.

12. The mixer of claim 10 wherein the deflector has a bottom with a radius of curvature that is substantially the same as a radius of curvature of the cylindrical portion of the driven end.

13. The mixer of claim 12 wherein the bottom of the deflector is spaced from the driven end to provide a bottom gap between the deflector and the driven end.

14. The mixer of claim 10 wherein the deflector has a bottom adjacent to and spaced from the cylindrical portion to define an arc on the cylindrical portion, wherein an angle subtended by the arc ranges from about 60° to about 75°.

15. The mixer of claim 10 wherein the deflector has a top surface that is spaced from an outer extent of the mixing blades to provide a top gap.

16. The mixer of claim 15 wherein, as the at least one mixing blade rotates, the top gap changes from a maximum to a minimum.

17. A mixer comprising:

a vessel with an opening, a first side wall, a second side wall spaced from and parallel to the first side wall, each side wall terminating at a bottom, a first end wall and a second end wall spaced from and parallel to the first end wall, with the second end wall having a recess;

a pair of parallel spaced apart shafts, each shaft extending from the first end wall to the second end wall and each shaft being provided with at least one mixing blade;

a discharge screw centrally located between the first and second side wall and disposed in a cavity provided in the bottom, the discharge screw has (a) a shaft with a first end that extends through the first end wall and (b) a driven end opposite the first end of the shaft, with the driven end being connected to a motor shaft for rotating the discharge screw in at least one direction; the driven end having a recessed portion that extends into the recess of the second end wall of the vessel; and, a deflector fixed to the second end wall and extending toward the first end wall, the deflector located between the mixing blades and the discharge screw.

\* \* \* \* \*